UNITED STATES PATENT OFFICE.

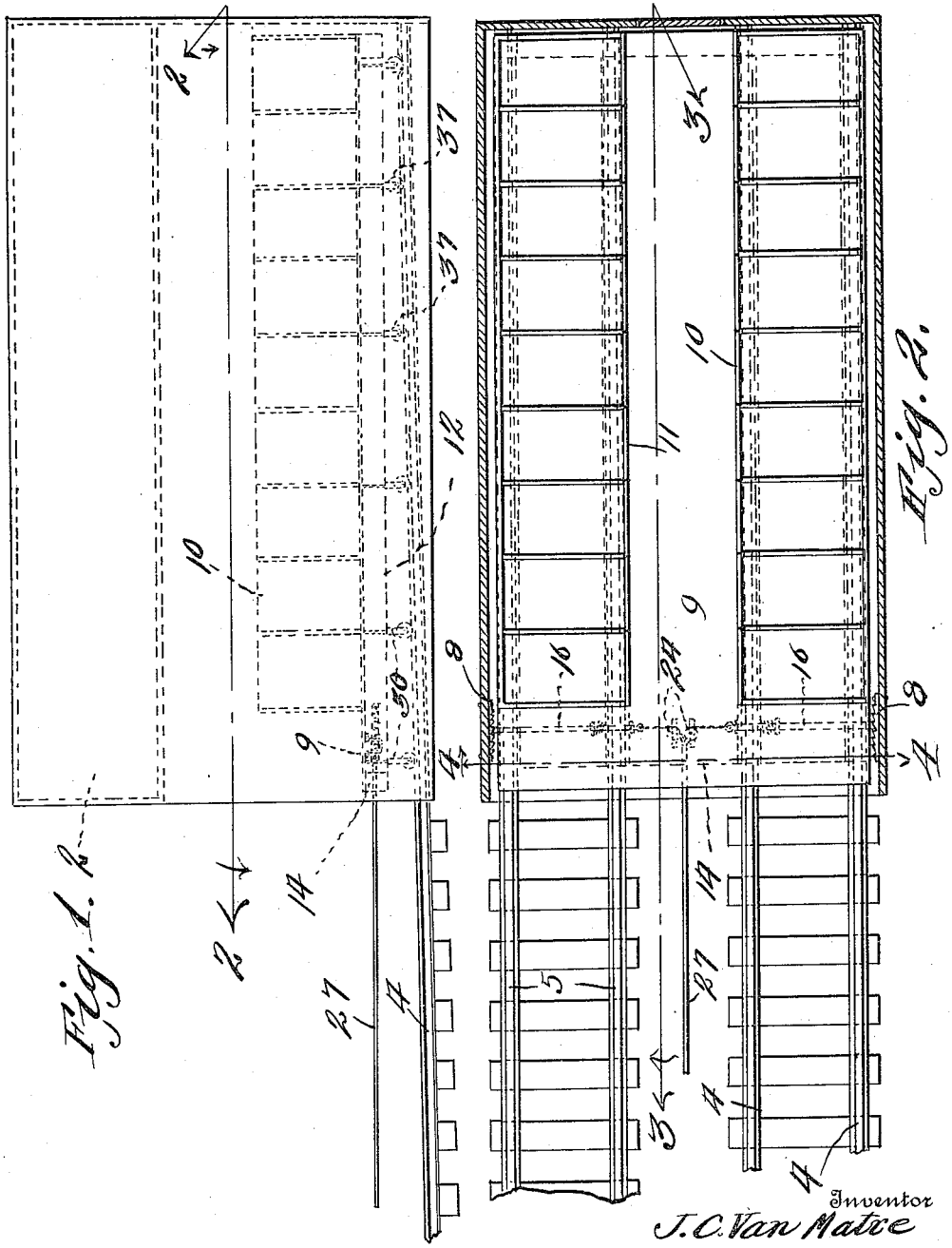

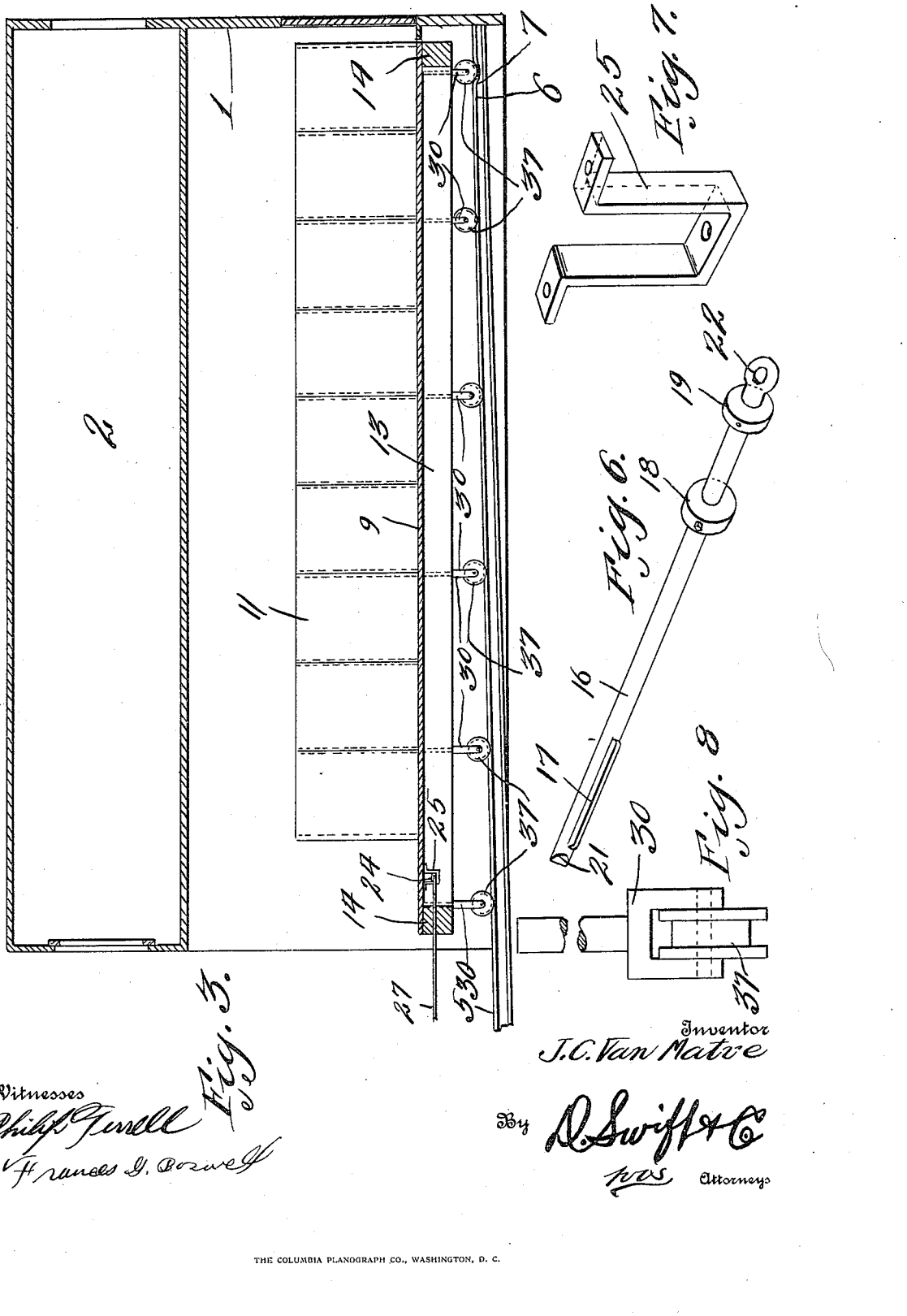

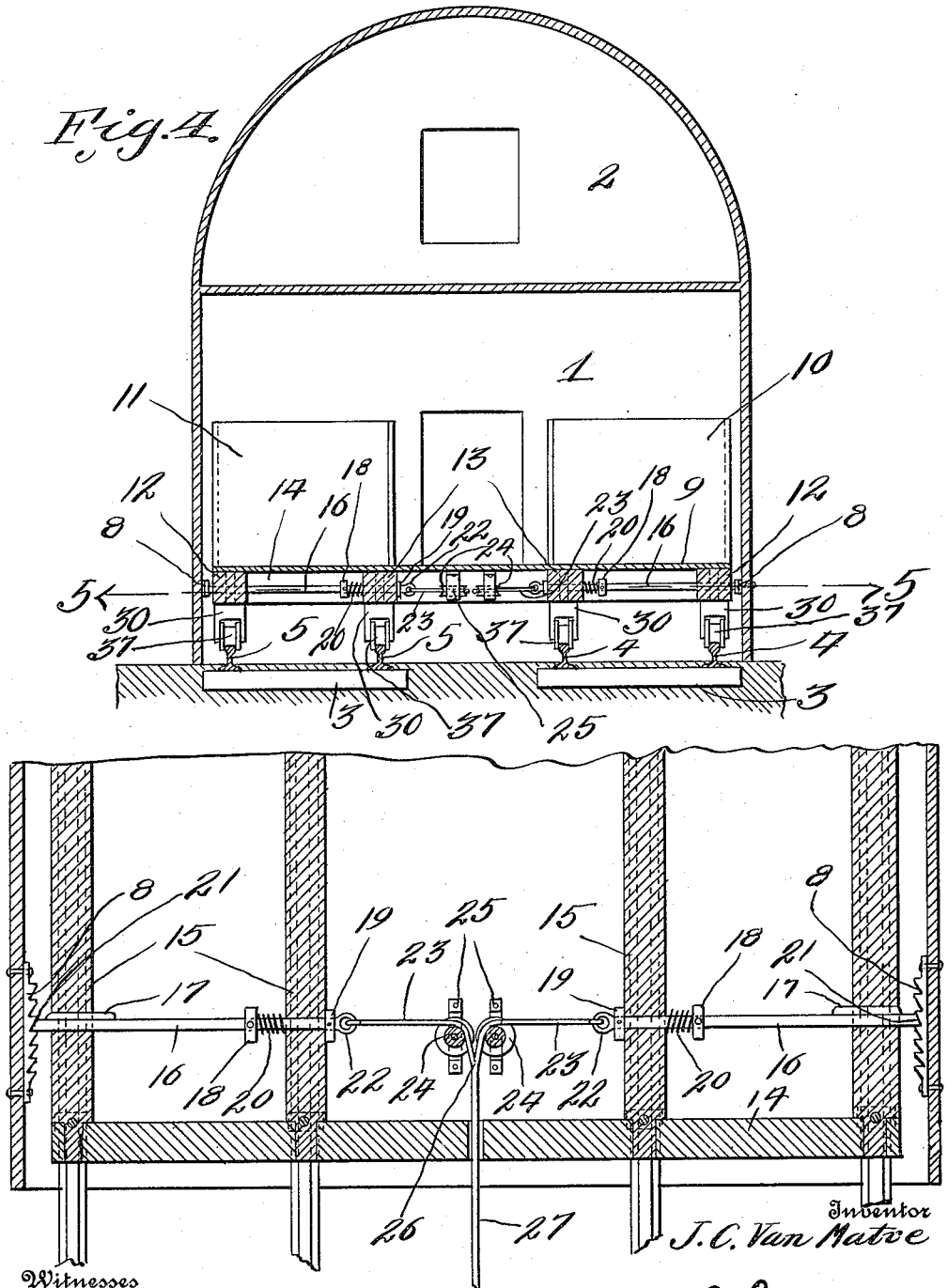

JAMES C. VAN MATRE, OF IOWA FALLS, IOWA.

PORTABLE OR REMOVABLE STALL FOR BARNS, STABLES, AND THE LIKE.

1,173,689.   Specification of Letters Patent.   Patented Feb. 29, 1916.

Application filed April 8, 1915. Serial No. 19,956.

*To all whom it may concern:*

Be it known that I, JAMES C. VAN MATRE, a citizen of the United States, residing at Iowa Falls, in the county of Hardin and State of Iowa, have invented a new and useful Portable or Removable Stall for Barns, Stables, and the like; and I do hereby declare the following to be a full, clear, and exact description of the invention, such as will enable others skilled in the art to which it appertains to make and use the same.

This invention relates to portable or removable stalls for barns and the like, and the aim of the invention is to provide an improved device of this nature having simple and efficient and practical means for detachably holding a plurality of stalls including the entire flooring on the interior of the barn or the like, and the object of which is that in case the barn catches on fire, said holding means may be released, subsequently to which the entire set of stalls including the complete flooring may be easily and quickly withdrawn, with the animals still in their stalls.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of a conventional form of barn, showing a plurality of stalls arranged therein in dotted lines. Fig. 2 is a sectional view on line 2—2 of Fig. 1. Fig. 3 is a sectional view on line 3—3 of Fig. 2 on an enlarged scale. Fig. 4 is a sectional view on line 4—4 of Fig. 2. Fig. 5 is a sectional view on line 5—5 of Fig. 4, on an enlarged scale. Fig. 6 is an enlarged detail view of one of the spring tensioned pins for assisting and holding the series of stalls and the complete flooring detachably in the barn. Fig. 7 is a detail view of a bracket for one of the pulleys over which a cable passes for operating the holding pins. Fig. 8 is a detail view of one of the flanged wheels and the bracket for supporting the stalls on the track.

Referring more especially to the drawings, 1 designates a conventional form of barn having a loft 2, and mounted upon suitable cross ties 3 (which are embedded in the foundation of the barn) are rails or tracks 4 and 5 arranged in pairs. These rails or tracks are inclined downwardly from one end of the barn, toward the other end (which in case of fire will be thrown entirely open, as shown) and beyond the open end. The end portions 6 of the rails or tracks are provided with slightly curved shoulders 7, the purpose of which will appear later. Upon the interior of the barn upon opposite sides are toothed racks 8. A portable flooring 9 is provided, and arranged upon the flooring adjacent its longitudinal side portions are two series of conventional stalls 10 and 11. The flooring 9 proper is secured to the longitudinally extending side and intermediate beams 12 and 13, and the end beams 14, which beams form a strong and substantial frame for the flooring. Mounted transversely in the end portions 15 of the longitudinal beams are elongated pins 16, which are cylindrical and are keyed at 17 in the longitudinal side beams, so as to prevent rotation of said pins. Mounted upon the pins 16 are collars 18 and 19, and interposed between the collars 18 and the intermediate longitudinal beams 13 are coil springs 20, acting to hold the beveled end 21 of the pins in engagement with the teeth of said racks 8, so as to hold the entire flooring and its frame in the barn upon the inclined tracks. The adjacent ends of the pins are provided with eyes 22, to which the short cables 23 (which pass over the pulleys 24 mounted in the brackets 25 of the under surface of the flooring) are connected. These cables 23 after passing over the pulleys 24 are spliced together as at 26 forming a single cable 27, which may connect to a suitable capstan (not shown), or to which any suitable power, such as horse power or the like (not shown) may be connected, in order that the entire flooring, frame therefor, and the series of stalls thereon may be quickly and easily withdrawn from the barn, in case it catches on fire. After the entire flooring is withdrawn from the barn, and has been disposed a reasonable distance therefrom to avoid the flames, and the pulling force on the cable 27 relieved, the springs 20 return the pins 16 to their normal position, the collars 19 acting to limit said pins to such normal position. However, in case the flooring is withdrawn from the barn for any cause whatsoever, other than a fire, and it is desired to return the same, the beveled end of the pins 16 will slide over the ratchet teeth of the racks, and hold the flooring in the position, as shown clearly in Figs. 2, 4 and 5. The longitudinal side and intermediate beams are provided with suitable caster brackets 30 having double flanged wheels 31, which engage the rails or tracks, to support the flooring portably on the tracks. However, the caster wheels at the inner end of the flooring or frame engage behind the shoulders 7 of said tracks, in order to prevent the flooring and frame from leaving the barn by gravitation down the inclined tracks, in case the pins have been accidentally withdrawn from engagement with the racks, or in case the horse power, while attaching the same to the flooring for its withdrawal, should prematurely exert force on the cable, which would disengage the pins. After disengaging the pins from the racks, and the power has been properly attached to the cable 27, sufficient force must be exerted, so that the caster wheels at the inner end of the flooring and frame may ride over the shoulder 7, after which it is very easy for the power that is used to impart movement to the flooring, which by its own weight will gravitate down the inclined rails.

The invention having been set forth, what is claimed as new and useful is:—

1. In combination with a barn having a series of inclined rails arranged on its foundation, a portable flooring including stalls having suitable caster wheels engaging said rails, and means for detachably holding said flooring in the barn against gravitation, and means designed to be overcome by the force exerted upon the first means to permit the flooring to gravitate after it is released.

2. In combination with a barn having a series of inclined rails arranged on its foundation, a portable flooring including stalls having suitable caster wheels engaging said rails, racks upon the interior faces of the opposite sides of the barn, spring tensioned pins mounted in bearings of the flooring to engage said racks for detachably holding the flooring in the barn against gravitation, means connected to the pins for synchronously operating the same to disengage them from the racks to release the flooring, and means designed to be overcome by the exerted force on the first means to permit the flooring to gravitate.

In testimony whereof I have signed my name to this specification in the presence of two subscribing witnesses.

JAMES C. VAN MATRE.

Witnesses:
E. E. BENEDICT,
R. E. MILLER.

Copies of this patent may be obtained for five cents each, by addressing the "Commissioner of Patents, Washington, D. C."